No. 655,743. Patented Aug. 14, 1900.
W. E. THOMAS.
DERRICK ATTACHMENT FOR HANDLING DRILL ROD SECTIONS OF WELL AUGERS.
(Application filed Nov. 17, 1899.)
(No Model.) 2 Sheets—Sheet 1.
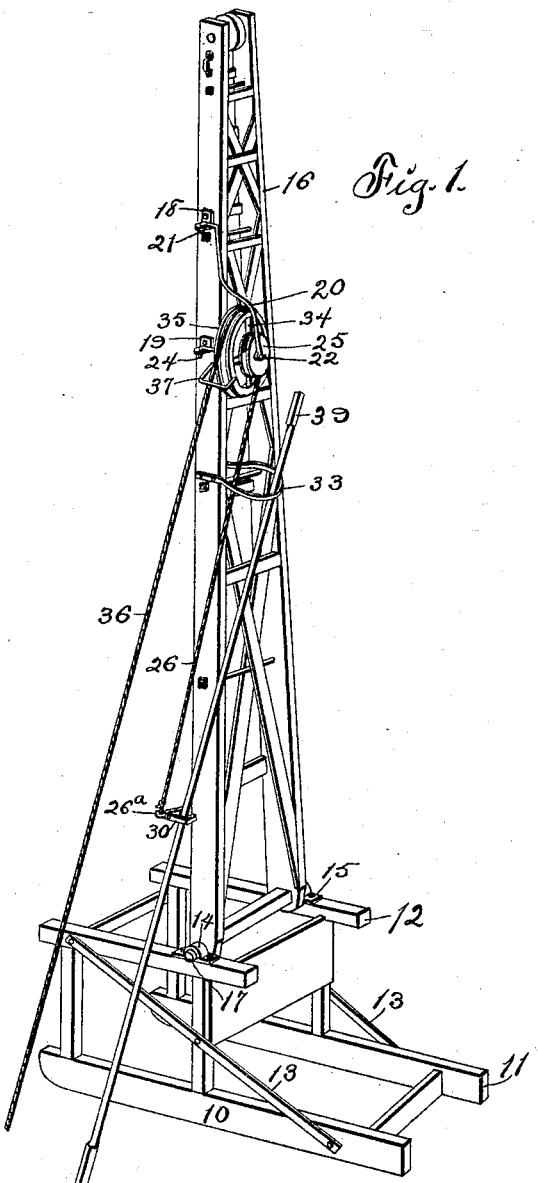

No. 655,743. Patented Aug. 14, 1900.
W. E. THOMAS.
DERRICK ATTACHMENT FOR HANDLING DRILL ROD SECTIONS OF WELL AUGERS.
(Application filed Nov. 17, 1899.)
(No Model.) 2 Sheets—Sheet 2.
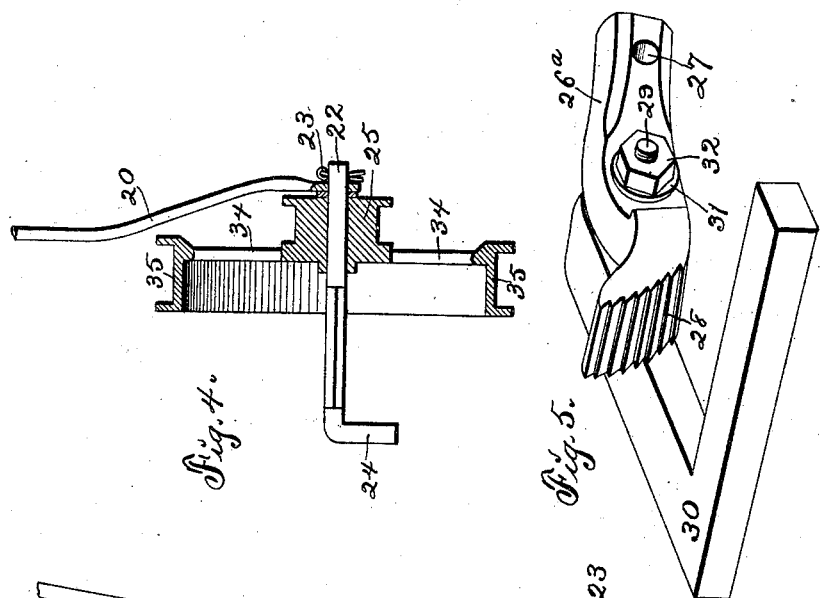
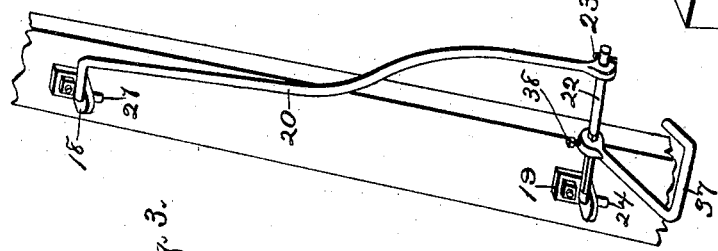
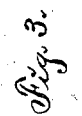
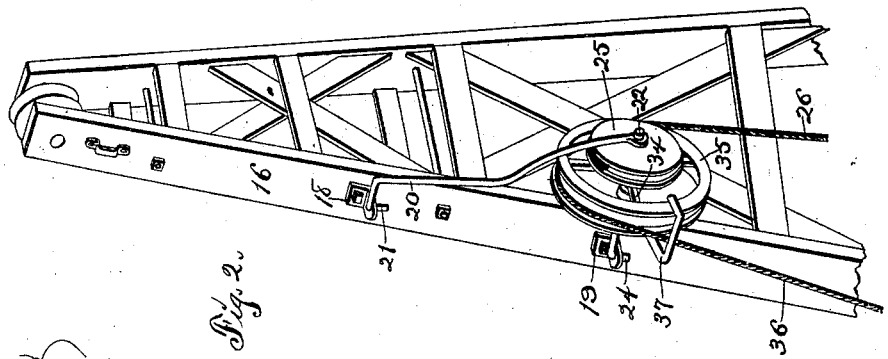
Witnesses: Inventor:
William E. Thomas,
By Thomas G. Orwig, Atty.

UNITED STATES PATENT OFFICE.

WILLIAM E. THOMAS, OF FONTANELLE, IOWA.

DERRICK ATTACHMENT FOR HANDLING DRILL-ROD SECTIONS OF WELL-AUGERS.

SPECIFICATION forming part of Letters Patent No. 655,743, dated August 14, 1900.

Application filed November 17, 1899. Serial No. 737,303. (No model.)

*To all whom it may concern:*

Be it known that I, WILLIAM E. THOMAS, a citizen of the United States, residing at Fontanelle, in the county of Adair and State of Iowa, have invented a new and useful Derrick Attachment for Handling Drill-Rod Sections of Well-Augers, of which the following is a specification.

My object is to facilitate the handling of sections of drill-rods in coupling and uncoupling them, as required in boring a deep well, in such a manner that my invention can be advantageously used in combination with a derrick and well-boring machinery.

My invention consists in the construction, arrangement, and combination of elements, as hereinafter set forth, pointed out in my claims, and illustrated by the accompanying drawings, in which—

Figure 1 is a perspective illustrating my device mounted as required for practical use. Fig. 2 is an enlarged detail perspective of a portion of the derrick and the differential pulley-block mounted thereon. Fig. 3 is a detail perspective illustrating the construction of the swiveled bearing, whereby the differential pulley-block is mounted on the derrick; and Fig. 4 is a detail elevation, partly in section, showing a portion of the bearing and the pulley-block thereon. Fig. 5 is a detail perspective of the gripping device carried by the lifting-rope.

In the construction of the machine as shown the numerals 10 11 designate sled-runners, on which is rigidly mounted a derrick-base 12, the base and runners being more rigidly connected by braces 13. Journal-bearings 14 15 are mounted on the top of the derrick-base 12, and a latticed derrick-frame 16 is provided with trunnions 17, projecting laterally from its lower end and journaled in the bearings 14 15. An ear 18 is mounted on and projects from one of the standards of the derrick-frame 16 and is vertically apertured. An ear 19 is mounted on one of the standards of the derrick-frame immediately below the ear 18 and is vertically apertured. A hanger 20 is provided and formed with a trunnion 21 on one end portion, which trunnion is arranged and so shaped as to be journaled in the aperture of the ear 18. The hanger 20 is formed with a flattened end portion on its end opposite the trunnion 21 and is apertured transversely in said flattened portion. A shaft 22 is mounted with one end portion thereof traversing the flattened extremity of the hanger 20 and secured by a split key 23 therein. The end portion of the shaft 22 opposite to the split key 23 is bent at right angles to the body portion of said shaft to form a trunnion 24, which trunnion is journaled in the ear 19. Thus by means of the hanger 20, shaft 22, trunnions, and ears a wheel-bearer is formed and swiveled or hinged to the derrick-frame. A pulley-block 25 is journaled on the shaft 22, adjacent the hanger 20, and a lifting-rope 26 is fixed at one end to and arranged to be wound upon the periphery of said pulley-block. A gripping-pawl 26ª is provided and formed with an aperture 27 transversely of one end portion thereof, by means of which aperture said gripping-pawl may be fixed to and suspended by the free end portion of the lifting-rope 26. The opposite end portion of the gripping-pawl 26ª is curved laterally and formed with a ratchet-faced surface 28, and the central portion of said pawl is apertured transversely for the admission of a bolt 29. An elbow-shaped frame 30 is formed on or fixed to the head portion of the bolt 29, and the lateral arm of said frame extends across and at a little distance from the ratchet-faced end portion of the pawl 26ª, Fig. 5. The gripping-pawl 26ª is secured to the bolt 29 by a washer 31 and nut 32 on said bolt and is free to revolve on the bolt relatively to the elbow-shaped frame 30. A metal loop is fixed to and projects rearwardly from the standard of the derrick-frame at some little distance below the block 25, and the lifting-rope 26 depends through said frame. Spokes 34 are fixed to and radiate from one margin of the block 25, and a drum-rim 35, of greater diameter than the block 25, is fixed to the extremities of said spokes. An operating-rope 36 is fixed at one end to and arranged to be wound upon the drum-rim 35, and the free end of said rope depends from said rim to the ground on which the runners 10 11 rest. A portion of the shaft 22 between the block 25 and trunnion 24 is made angular in cross-section, Fig. 4, and a yoke-arm 37 is slidingly mounted thereon, secured thereto by a set-screw 38 and projected therefrom radially of and beyond the drum-rim 35. The extremity of the yoke-arm 37 is bent to extend across the face of the drum-rim 35 and again bent inwardly to overlap the opposite side of said drum-rim and serve as a guide to prevent accidental removal of the operating-rope from the drum-rim.

The derrick-frame may be provided with any desired means for operating augers and drills to penetrate or remove earth; but such means form no part of my present invention and are not illustrated nor described herein.

In practical use the central portion of a section 39 of drill-rod, auger-stem, casing, or pipe is engaged between the lateral arm of the elbow-shaped frame 30 and the ratchet-faced convex surface of the gripping-pawl 26$^a$. Manual force is then applied to unwind the operative rope 36 from the rim 35, thus revolving said rim and the block 25, winding the lifting-rope 26 on said block 25, and lifting the section 39 from the ground. In the further elevation of the section 39 it may be tilted manually and caused to enter at one end within the metal loop 33 and thereafter guided and sustained in an approximately-vertical position thereby, as illustrated in Fig. 1. While the section 39 is sustained by the lifting-rope, it may be adjusted in alinement with and attached to any other device whereby it is operated or by means of which it may be desired to operate. Upon a relaxation of the lifting force applied to the rope 36 the gripping device embracing the section 39 will release and descend and may be freed from said section, after which the pulley-block and its hanger or support may be swung laterally away from the section 39 and out of the way of any other mechanism that may be employed in conjunction therewith.

I claim as my invention—

1. In a derrick attachment for handling drill-rod sections, a shaft for pulleys having a right-angled extension at one end adapted to enter a fixed perforated ear, a hanger having a shaft-bearing at its lower end and a hook-shaped trunnion at its other end, a yoke or rope-guide extending at right angles from the shaft, two pulleys mounted on the shaft to rotate jointly, a rope fixed to each pulley and perforated ears fixed to a derrick for pivotally connecting the shaft and hanger with the derrick, all arranged and combined to operate in the manner set forth for the purposes stated.

2. In a derrick attachment for handling drill-rod sections, a shaft for pulleys having a right-angled extension at one end adapted to enter a fixed perforated ear, a hanger having a shaft-bearing at its lower end and a hook-shaped trunnion at its other end, a yoke or rope-guide extending at right angles from the shaft, two pulleys mounted on the shaft to rotate jointly, a rope fixed to each pulley and perforated ears fixed to a derrick for pivotally connecting the shaft and hanger with the derrick, and a metal loop fixed to the derrick at a point below the shaft and pulleys, all arranged and combined to operate in the manner set forth for the purposes stated.

3. A derrick attachment for handling drill-rod sections, comprising a shaft for pulleys having a right-angled extension at one end adapted to enter a fixed perforated ear, a hanger having a shaft-bearing at its lower end and a hook-shaped trunnion at its other end, a yoke or rope-guide extending at right angles from the shaft, two pulleys mounted on the shaft to rotate jointly, a rope fixed to each pulley and perforated ears fixed to a derrick for pivotally connecting the shaft and hanger with the derrick, a metal loop fixed to the derrick at a point below the shaft and pulleys and an elbow-shaped frame having a pawl pivoted thereto and the outer end of the pawl fixed to the end of the rope on the smallest of the two pulleys, all arranged and combined to operate in the manner set forth for the purposes stated.

WILLIAM E. THOMAS.

Witnesses:
THOMAS G. ORWIG,
GEO. Y. KELLY.